United States Patent
Gibbs et al.

(10) Patent No.: US 10,545,749 B2
(45) Date of Patent: Jan. 28, 2020

(54) SYSTEM FOR CLOUD COMPUTING USING WEB COMPONENTS

(71) Applicant: Samsung Electronics Co., Ltd., Suwon-si, Gyeonggi-do (KR)

(72) Inventors: Simon J. Gibbs, San Jose, CA (US); Swaroop Kalasapur, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 611 days.

(21) Appl. No.: 14/641,754

(22) Filed: Mar. 9, 2015

(65) Prior Publication Data
US 2016/0057220 A1 Feb. 25, 2016

Related U.S. Application Data

(60) Provisional application No. 62/039,807, filed on Aug. 20, 2014.

(51) Int. Cl.
*G06F 8/65* (2018.01)
*G06F 17/22* (2006.01)

(52) U.S. Cl.
CPC ............ *G06F 8/65* (2013.01); *G06F 17/2247* (2013.01)

(58) Field of Classification Search
CPC .......... G06F 17/2247; G06F 17/30861; G06F 9/44521; G06F 17/30893; G06F 17/30899; G06F 8/35; G06F 17/30896; G06F 17/2205; G06F 17/2211; G06F 17/30905; G06F 9/455; H04L 67/02

USPC ......................................................... 709/203
See application file for complete search history.

(56) References Cited

U.S. PATENT DOCUMENTS

| | | | |
|---|---|---|---|
| 5,175,856 A | 12/1992 | Van Dyke et al. | |
| 6,678,715 B1* | 1/2004 | Ando | G06F 9/4862 709/201 |
| 6,718,371 B1* | 4/2004 | Lowry | G06F 9/542 709/201 |
| 6,973,625 B1 | 12/2005 | Lupo et al. | |
| 7,447,991 B2 | 11/2008 | Sayers et al. | |
| 7,979,804 B1* | 7/2011 | Schang | G06F 9/451 715/763 |
| 8,260,845 B1* | 9/2012 | Colton | G06F 8/30 709/202 |
| 8,560,465 B2 | 10/2013 | Jeong et al. | |
| 8,595,284 B2 | 11/2013 | Sheshagiri et al. | |
| 8,635,518 B1 | 1/2014 | Bhanoo | |
| 8,914,774 B1* | 12/2014 | Colton | G06F 9/44578 709/203 |
| 2003/0046370 A1* | 3/2003 | Courtney | H04L 41/0266 709/220 |
| 2003/0154288 A1* | 8/2003 | Takamura | H04L 29/06 709/227 |
| 2004/0026793 A1 | 2/2004 | Sefidvash | |

(Continued)

*Primary Examiner* — William G Trost, IV
*Assistant Examiner* — Imran Moorad

(57) ABSTRACT

In one aspect, a method for executing a web component using a server device will be described. A web component is provided at a client device. The client device also provides a shadow DOM based on the web component. The shadow DOM is synchronized with a shadow DOM cache at a server device. Various implementations relate to methods, server devices, client devices, software development kits and computer readable mediums that are involved in executing a web component at a server device.

15 Claims, 12 Drawing Sheets

(56) References Cited

U.S. PATENT DOCUMENTS

| | | | |
|---|---|---|---|
| 2004/0103373 A1* | 5/2004 | Wei | G06F 17/2247 715/234 |
| 2005/0267915 A1 | 12/2005 | Zhulong et al. | |
| 2006/0265662 A1* | 11/2006 | Gertzen | G06F 9/4443 715/760 |
| 2007/0061700 A1* | 3/2007 | Kothari | G06F 17/30905 715/234 |
| 2007/0234199 A1* | 10/2007 | Astigeyevich | G06F 17/2247 715/234 |
| 2008/0032695 A1* | 2/2008 | Zhu | H04W 36/0022 455/442 |
| 2008/0098412 A1 | 4/2008 | Zhou et al. | |
| 2009/0177734 A1 | 7/2009 | Arthursson | |
| 2009/0210631 A1 | 8/2009 | Bosworth | |
| 2010/0131590 A1 | 5/2010 | Coleman et al. | |
| 2010/0211865 A1 | 8/2010 | Fanning et al. | |
| 2011/0066957 A1 | 3/2011 | Prats et al. | |
| 2011/0145360 A1 | 6/2011 | Sheshagiri et al. | |
| 2011/0264787 A1 | 10/2011 | Mickens | |
| 2011/0282940 A1 | 11/2011 | Zhang et al. | |
| 2012/0072488 A1 | 3/2012 | Manion et al. | |
| 2012/0260157 A1 | 10/2012 | Zhu et al. | |
| 2013/0036157 A1* | 2/2013 | Toupin | G06F 16/986 709/203 |
| 2013/0086127 A1* | 4/2013 | Pogmore | G06F 17/30911 707/803 |
| 2013/0212462 A1* | 8/2013 | Athas | H04L 67/10 715/234 |
| 2013/0254855 A1 | 9/2013 | Walters et al. | |
| 2014/0047318 A1 | 2/2014 | Glazkov | |
| 2014/0067854 A1* | 3/2014 | Simon | G06F 16/951 707/769 |
| 2014/0095695 A1* | 4/2014 | Wang | G06F 9/5088 709/224 |
| 2014/0136945 A1 | 5/2014 | Ligman et al. | |
| 2014/0136954 A1 | 5/2014 | Ligman et al. | |
| 2014/0250367 A1 | 9/2014 | Ivory et al. | |
| 2014/0337405 A1* | 11/2014 | Athas | H04L 67/26 709/203 |
| 2015/0193399 A1* | 7/2015 | Woker | H04L 41/02 715/234 |
| 2016/0188548 A1* | 6/2016 | Ciabarra, Jr. | G06F 16/986 715/234 |

* cited by examiner

```
 1  <my-element attributes="api1 api2">
 2
 3    <template>
 4      <div id="mydiv"></div>
 5    </template>
 6
 7    <script>
 8
 9      Register('my-element', {
10
11        api1: function() { ... },
12
13        api2: function() { ... },
14
15      });
16    </script>
17
18  </my-element>
```

FIG. 7A

```
 1  <html>
 2  <head>
 3    <link rel="import" href="my-element.html">
 4
 5    <script>
 6    function() testit() {
 7      var my = document.querySelector("my-element");
 8
 9      my.api1();
10      my.api2();
11    }
12    </script>
13  </head>
14
15  <body onload="testit()">
16
17    <my-element/>
18
19  </body>
20  </html>
```

704 — line 3
706 — line 17

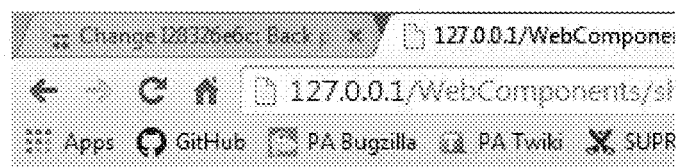

Audio Player

FIG. 7C

SYSTEM FOR CLOUD COMPUTING USING WEB COMPONENTS

CROSS-REFERENCE TO RELATED APPLICATIONS

This application claims priority to U.S. Patent Application No. 62/039,807, entitled "System for Cloud Rendering and Cloud Compute Using Web Components," filed Aug. 20, 2014, which is incorporated herein its entirety for all purposes.

FIELD OF THE INVENTION

The present invention relates generally to technologies used in web applications. More specifically, the present invention relates to a system for executing a web component at a remote server device.

BACKGROUND

A common way of accessing the Internet is through a web browser. Web browsers can take a variety of forms. Some web browsers are installed on desktop computers, such as a personal computer running Microsoft Windows or Mac OS. Well known desktop web browsers include Google Chrome, Microsoft Internet Explorer and Mozilla Firefox. Other types of browsers are built into mobile applications that are downloaded from online stores and stored on mobile devices. For example, many popular mobile device applications use a browser engine that retrieves and renders data from the Internet.

Web browsers execute software that is referred to as a web application. One well known example of a web application is an Internet document or web page. In a typical web browsing session, a user will enter an address into a browser (e.g., http://www.yahoo.com) that is installed on a client device. The inputting of the address causes the browser to download a web application from a server associated with the address. The browser then executes the web application, which causes a web page to be displayed on the browser.

Web applications can be written in a variety of different scripts and languages. Most common languages are HTML, Javascript and CSS. With some scripts, such as Javascript, the script is executed at the client device. The execution of these languages can lead to the creation of dynamic and interactive applications. Example applications include movie players, image viewers, buttons, user interfaces, graphics, games and other features.

As web applications become increasingly complex, the execution of their associated scripts can require greater amounts of overhead and processing power. If the script is a client-side script such as Javascript, this can cause the performance of the client device and/or the browser to slow down. As a result, there are ongoing efforts to improve the performance of browsers and their ability to execute web applications.

SUMMARY

In one aspect, a method for executing a web component using an external server device is described. A web component is provided at a client device. The client device also provides a shadow DOM, which is based on the web component. The shadow DOM is synchronized with a shadow DOM cache at a server device such that the shadow DOM cache is at least in part a copy of the shadow DOM. The synchronization occurs over a network (e.g., the Internet) that connects the client device with the server device. A variety of other operations may be performed as well. In various embodiments, for example, a web component is migrated from the client device to the server device. In still other embodiments, a subtree in the shadow DOM cache is compacted to a single node at the shadow DOM. Any of the above operations can be stored in the form of executable computer code in a computer readable storage medium.

In another aspect, a method for providing software tools to a developer is described. One or more functions for synchronizing the shadow DOM with the shadow DOM cache are provided. Additional functions may be provided that relate to any of the above method operations. The functions can be included in a library that is provided in a software development kit.

In another aspect, a server device will be described. The service device includes one or more processors and a memory unit that stores computer readable instructions. When the instructions are executed by the one or more processors, they cause the server device to provide a web component. A shadow DOM cache is provided, which is at least in part a copy of the shadow DOM stored at the client device. The shadow DOM is synchronized with the shadow DOM cache over a network that connects the client device with the server device.

BRIEF DESCRIPTION OF THE DRAWINGS

The invention and the advantages thereof, may best be understood by reference to the following description taken in conjunction with the accompanying drawings in which:

FIGS. 7A, 7B and 7C are images of various aspects of an example web component.

In the drawings, like reference numerals are sometimes used to designate like structural elements. It should also be appreciated that the depictions in the figures are diagrammatic and not to scale.

DETAILED DESCRIPTION

The present invention relates to web application technologies. More specifically, the present invention involves a web component that can be executed at a client device and/or at a remote server device. This can help enhance the performance of the client device, since some of the overhead involved in processing the web component is offloaded to the server device.

Figure 1:
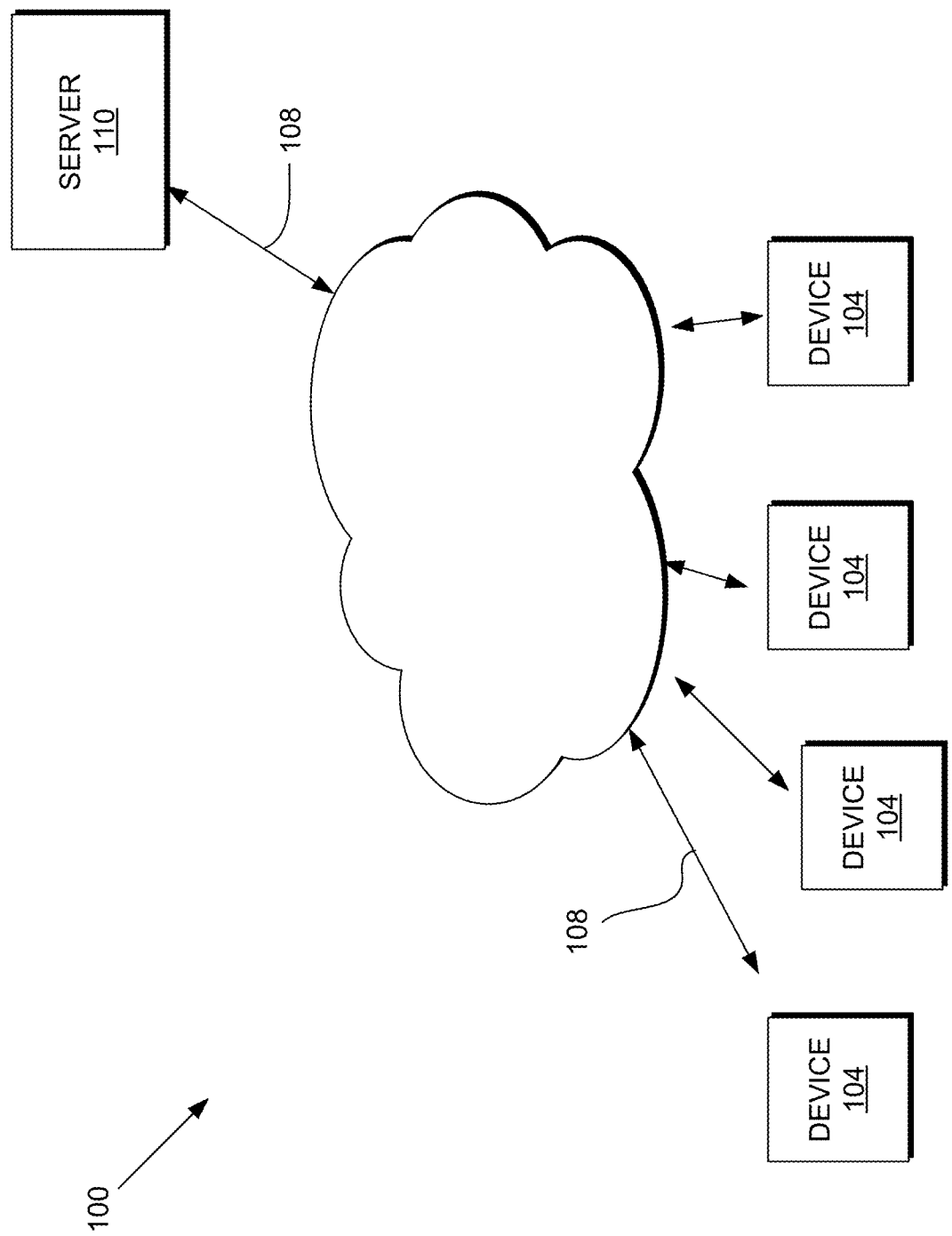
FIG. 1 is a block diagram of a communications system according to a particular embodiment of the present invention.

Referring initially to FIG. 1, an example system for executing a web component at a remote server device will be described. The system includes multiple client devices 104 and a server device 110. The client devices 104 and the server 110 communicate with one another using one or more networks 108.

Any suitable network 108 may be used to connect the devices 104 and the server 110. In various embodiments, the network 108 involves but is not limited to a cellular network based on CDMA or GSM, the Internet or any other suitable protocol or any other communication network.

In an example implementation, a client device 104 obtains a web application. In various implementations, the web application (e.g., a web page) is downloaded from a content server (not shown) over the Internet. The web application is passed to a browser that is installed on the client device 104. The browser parses the web application.

In this example, the web application includes one or more web components. A web component is any software code in a web application having two features. For one, the web component is at least partially encapsulated from code in other parts of the web application. Consider an example in which the web application is a web page with code that defines particular web page styles (e.g., using CSS) and variables. In various implementations, these styles and/or variables do not intrude into the web component. That is, the web page styles do not directly affect the rendering of the web component, and the web component generally retains control over the definition of variables, even if it contains variables that share the same names as those used in the rest of the web page. In this way, the rendering of the web application is (partially) insulated from the effects of outside code. (The above description of course assumes that the web component is not explicitly coded to allow for the incorporation of outside variables or styles.)

This insulation leads to another feature of a web component, which is that a web component is reusable. That is, the web component can be written once in a particular web page and then instantiated multiple times (e.g., to generate multiple buttons or other web component-based features when the web page is displayed.) Additionally, because the rendered web component is (partially) insulated from styles or variables that are defined outside of the web component, it can easily be copied and embedded in a wide variety of different types of code and applications, while preserving its general functionality.

Generally, web components are programmed in a client-side programming language. An example of such a language is Javascript, although this is not a requirement. Any suitable client-side programming language or software language can also be used.

A web component can be understood to have any of the features of web components as defined in a specification issued by the World Wide Web Consortium (W3C). However, it should be appreciated that this application also contemplates web components that depart from this definition. That is, any suitable reusable software that is at least partially encapsulated from surrounding code may also be considered to be a web component for the purpose of this application.

Returning to FIG. 1, the browser at the client device 104 parses the web component and the web application. When the web application and web component are parsed, the browser builds a Document Object Model (DOM) tree. A DOM tree is any mechanism for representing the structure of a document (e.g., a web page, a web application, etc.) The DOM includes multiple nodes that are connected with links. In various embodiments, the DOM has a tree-like structure, although the structure may assume any form or shape (e.g., a graph, a network, etc.) Each node represents an object or element in the document. The links between the nodes help indicate how these objects/elements are organized in the document.

The DOM serves as an interface for representing and manipulating the document. For example, a developer may wish to insert Javascript into a web document that dynamically modifies a particular part of the document (e.g., that cause a visual change in response to a user action.) The developer can write Javascript code for the web component that references and changes the DOM. When the browser renders the web page, the changes made to the DOM will be reflected in the displayed web page, since the DOM represents the structure of the web page. The DOM thus makes it easier for developer to adjust elements or parts of a document.

It should be noted that the DOM tree does not necessarily strictly represent all the code written for the document and web component. Rather, the DOM tree represents the structure of the document as parsed by the browser. That is, if the document is coded to be dynamic and respond to different events and inputs, any particular DOM tree only represents a single iteration of the document, which may change if other events and inputs are received.

In addition to the DOM, when the web application and the web component are executed, the browser also generates a shadow DOM. The shadow DOM is a portion of the DOM tree that represents the structure of the web component. The shadow DOM is thus made up of one or more subtrees of the DOM tree.

A simplified example of a web component, a DOM and a shadow DOM are shown in FIGS. 7A-7C and FIG. 8. FIG. 7A illustrates simplified code for a web component. In this example, the web component is referenced using the customized HTML tag, <my-element>. FIG. 7B illustrates code for a web page, in which the web component is incorporated (section 704) and instantiated (section 706). In this example, the web page, when rendered and displayed at the browser, includes an interactive audio player 708, which is shown in FIG. 7C and is generated by the instantiation of the web component.

Figure 8:
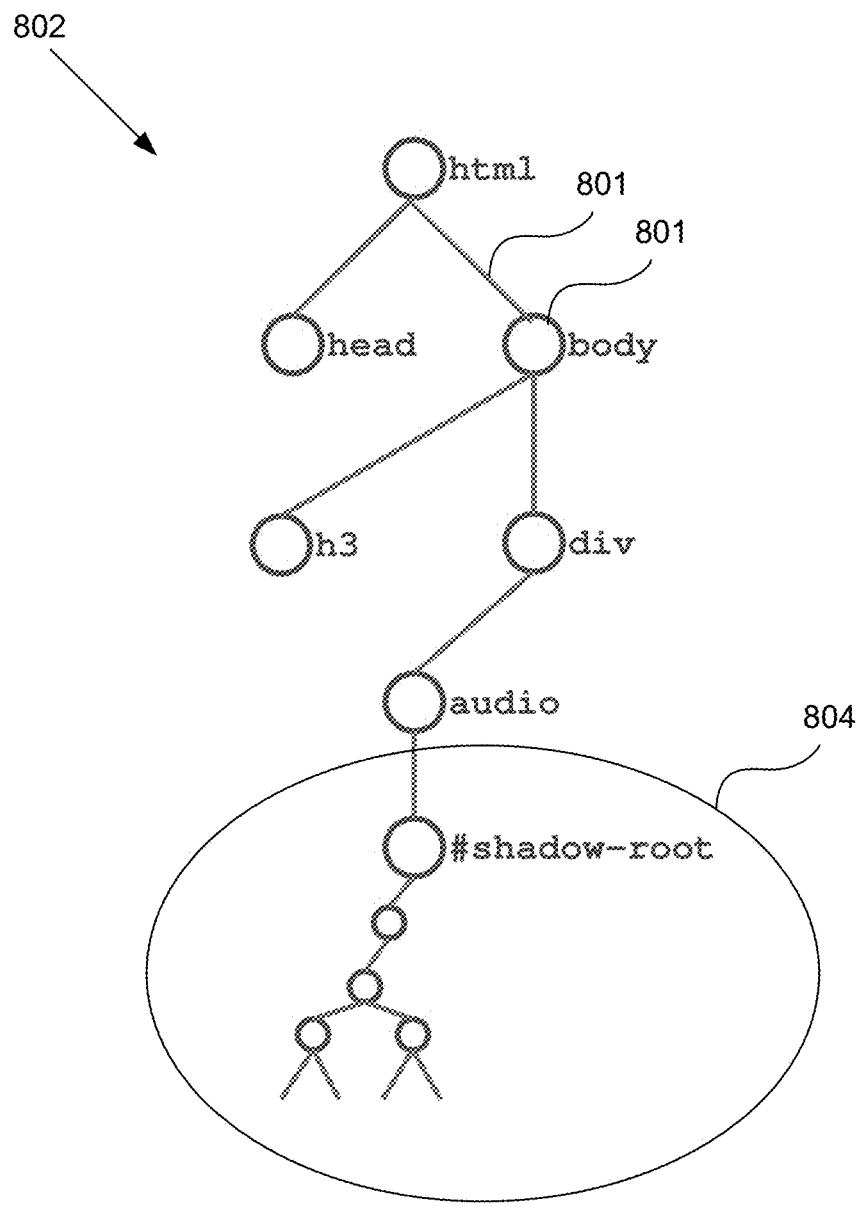
FIG. 8 is a simplified diagram of a DOM and a shadow DOM according to a particular embodiment of the present invention.

FIG. 8 illustrates a sample DOM 802. In the illustrated embodiment, the DOM 802 is a tree structure that is made of multiple nodes 801 connected by links 803. Various connected nodes at the bottom of the DOM tree comprise the shadow DOM 804, which represents the structure of a web component.

Returning to FIG. 1, after executing the web application and web component and generating a DOM and a shadow DOM, the client device 104 determines that the web component can be executed at a remote server device. In some situations, this is preferable, since it reduces the processing load on the client device. This can be particularly useful in situations in which the client device 104 has substantially less processing power than the remote server device e.g., when the client device is a mobile phone, a wearable device, etc.

As will be described in greater detail later in the application, the remote execution of the web component involves synchronizing the operations of the client device 104 and the server device 110. More specifically, the client web component and the shadow DOM are copied to the server device 110. The copy of the client web component is referred to herein as the server web component. The copy of the shadow DOM at the server device 110 is referred to as a shadow DOM cache. When events or inputs are received at the client web component, these inputs/events are transmitted to the server web component. Based on these inputs/events, the server device 110 executes the web component and makes corresponding changes to the shadow DOM cache. These changes are synchronized with changes to the shadow DOM at the client device 104. The web application is then rendered at the client device 104 based in part on the modified shadow DOM.

Figure 2:
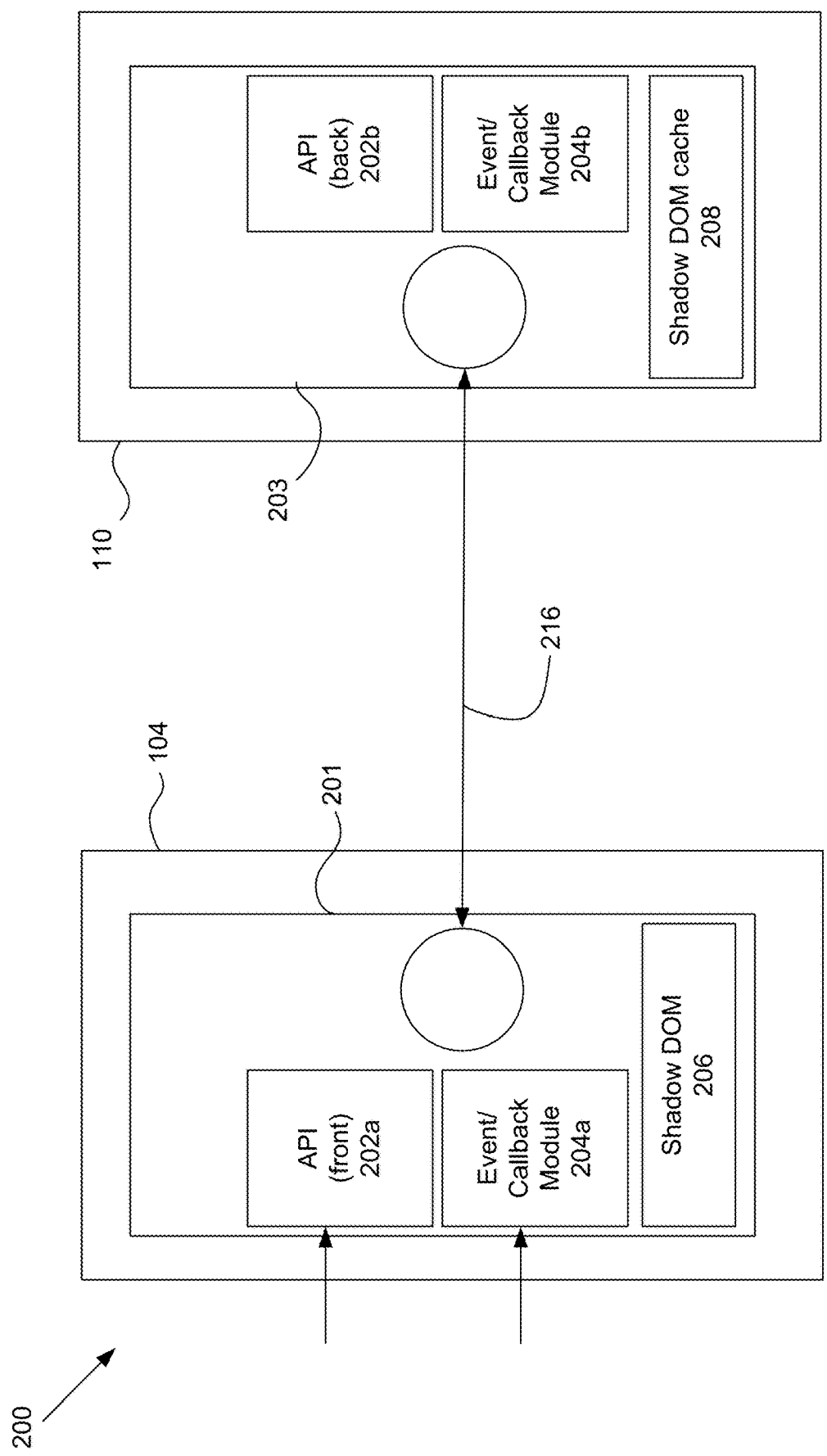
FIG. 2 is a block diagram of a client web component and a server web component according to a particular embodiment of the present invention.

An example diagram 200 of a client web component 201 and a server web component 203 is illustrated in FIG. 2. The client web component 201 includes an application programming interface (API) module 202a, an events/callback module 204a and a shadow DOM 206. The server web component 203 includes an API module 202b, an events/callback module 204b and a shadow DOM cache 208. In this example, the client web component 201 and the server web component 203 are software that is stored at the client device 104 and server device 110, respectively. The client web component 201 may be embedded in the code for a downloaded web application. The client web component 201 communicates with the server web component 203 using a relay 216, which is any suitable connection that extends between the client device 104 and the server device 110 across the network 108.

The API 202a of the client web component 201 is arranged to receive input, commands or arguments (e.g., commands to retrieve data, etc.) from software. The event/callback module 202b is arranged to receive and process events (e.g., mouseclicks, mouseovers, user actions, etc.) and callbacks. Normally, if there was no connection to the remote server device 110, events/input received at the client web component 201 would cause the client web component 201 to modify the shadow DOM as appropriate based on the input. However, in this example, the client web component 201 does not immediately process the incoming input or make changes to the shadow DOM 206. Instead, the client web component 201 is arranged to transmit the input to the server device 110 for further processing.

Many of the functionalities at the client web component 201 are mirrored at the server web component 203. The API module 202b and event/callback module 204b at the server web component 203 are arranged to receive and process the input passed through the relay. The server web component 203 is arranged to modify the shadow DOM cache based on the input. Since the server web component 203 is generally a copy of the client web component 201, in various applications, the server web component 203 modifies the shadow DOM cache in generally the same manner that the client web component 201 would modify the shadow DOM 208, if that process were not offloaded to the server device 110. Thus, the overhead required to perform this action has been transferred from the client device 104 to the server device 110.

The server web component 203 is then arranged to transmit a reply through the relay back to the client web component 201. The reply indicates the changes made to the shadow DOM cache 208. In response to the reply, the client web component modifies/updates the shadow DOM 206 based on those changes. As will be discussed later in the application, the changes made to the shadow DOM 206 may (almost) identically mirror the changes made to the shadow DOM cache 208, although under some applications they may also differ somewhat. The client device 104 is then arranged to render the web application. The rendering of the web application reflects the changes made to the shadow DOM 206.

Figure 3:
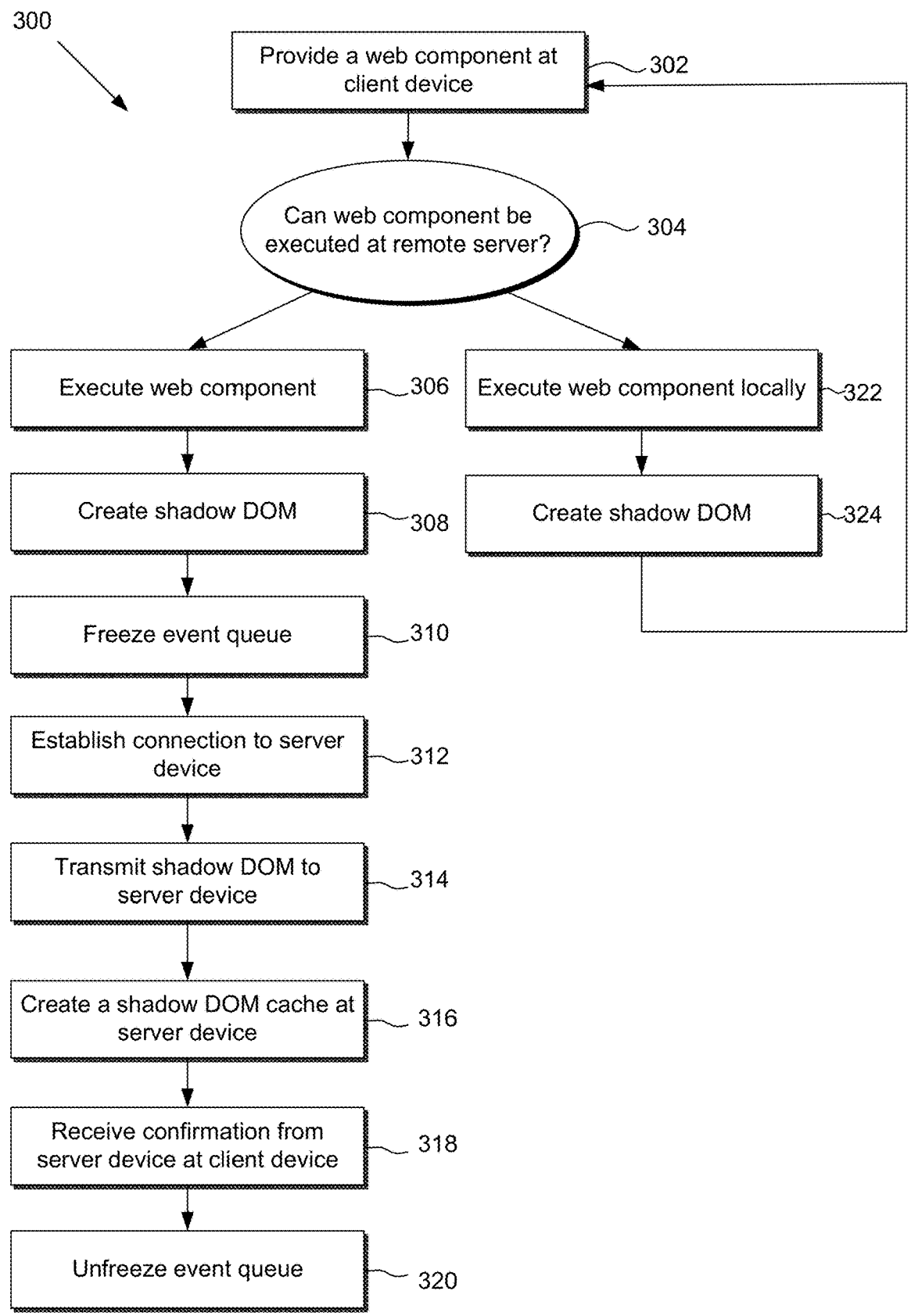
FIG. 3 is a flow diagram illustrating a method for migrating a web component to a remote server device according to a particular embodiment of the present invention.

Referring next to FIG. 3, an example method 300 for migrating a web component 201 to a remote server device 110 will be described. The migration allows the web component to be executed at the server device 110. Initially, at step 302, a web component 201 is provided at a client device 104. For example, the client device 104 may have downloaded the component as part of a web document or application. Any suitable type of reusable and/or encapsulated web component may be used. In some embodiments, the web component is a web component as defined under the specification provided by W3C, although other types of web components may be used as well.

At step 304, a determination is made as to whether the web component can be executed at a remote server device 110. This may be determined in a variety of ways. In some implementations, for example, when the browser of the client device 104 is parsing the code for the web component 201, it may identify a tag or other code fragment indicating that the web component 201 has a remote execution capability (i.e., can be executed remotely at the server device 110.) By way of example, as previously discussed, a web component may be assigned to a customized tag, such as the following HTML tag:

```
<my-element>
or
<my-element oncloud=false>
```

In the above examples, the above tags are missing a specialized flag or marker indicating that the web component can be executed remotely. Thus, the browser/client device determines that the web component should be executed locally at the client device and the method proceeds to step 322. In other situations, however, the HTML tag instead includes a flag indicating that the associated web component can be executed at a remote server device 110. An example of such a tag is provided below:
<my-element oncloud=true>

In some implementations, when the client device 104 detects such a flag, it determines that the web component 201 should be executed at a remote server device 110 and the method 300 proceeds to step 306. Of course, it should be appreciated that the flag or trigger indicating a remote execution capability may take any suitable form that may depart significantly from the simple examples described above.

In still other embodiments, however, even if the web component 201 is capable of being executed remotely, the client device/browser may determine that the web component should instead be executed locally. Such a determination may be based on a wide variety of factors, such as network conditions, available processing power or memory at the client device 104, available processing power or memory at the server device, battery status at the client device, etc. Put another way, remote execution of the web component 201 may not be allowed if poor network conditions would not allow the client device 104 to properly communicate with the server device 110. Alternatively, if the client device 104 has ample processing power, a determination may be made that the web component 201 can be executed locally and/or that remote execution of the web component is unnecessary. The determination at step 304 can take into account any suitable feature or parameter of the client device 104, the server device 110 and/or the network 108.

If it is determined at step 304 that the web component cannot or should not be executed at a remote server device 110, then the method proceeds to step 322. At step 322, the web component 201 is executed at the client device. At step 324, a shadow DOM 206 is generated based on the web component 201. The method 300 returns to step 302.

It should be noted that over time, a web component 201 that has been executed only at the local client device 104 for a period of time may at some point be executed at the server device 110. That is, at some point a different determination is made at step 304, possibly based on a change in network conditions or other parameters at the client device 104 and/or server device 110. In that case, the method proceeds to step 306.

Returning to step 304, if a determination is made that the web component 201 should be executed at a remote server device 110, then the method 300 proceeds to step 306. At step 306, the client device/browser executes the web component. At step 308, the client device/browser generates a shadow DOM 206 at the client device 104 based on the web component. The shadow DOM 206 is a representation of the structure of the web component 201. (It should be noted that steps 306 and 308 may be unnecessary if they have already been performed e.g., at step 322 and 324.)

At step 310, the event queue is frozen. That is, any events, callbacks and other inputs or requests received at the API module 202a or the event/callback module 204a are stored at their respective modules and are not transmitted to the server device 110. This is done to preserve the current state of the shadow DOM 206 and to help prepare it for transmission to the server device 110. Generally, any updates to the shadow DOM 206 are frozen at this time.

At step 312, the client device/web component establishes a connection with the server device 110 e.g., the relay 216 of FIG. 2. Data relating to the shadow DOM 206 and/or the web component 201 are prepared for transmission. In various implementations, a method is invoked (e.g., preMigrate( )) at the client device/browser that captures the state of the web component and the shadow DOM. In some approaches, the data is then serialized into a suitable format (e.g., JSON, XML, etc.) before being transmitted. The client device/web component then transmits the shadow DOM/web component data to the server device 110 (step 314).

The data is then received at the server device 110. Based on the received data, a server web component 203 and the shadow DOM cache 208 are created (step 316). In various embodiments, the shadow DOM cache 208 is an identical or at least substantially complete copy of the shadow DOM 206. Additionally, the server web component 203 is (almost) identical to or substantially similar to the client web component 201. That is, all the code and software modules from the client web component 201 that are needed to simulate the behavior and performance of the web component 201 are now at the server device 110 in the form of the server web component 203.

The server device/server web component then prepares a reply for transmission back to the client device 104. In some embodiments, the server device/server web component invokes a predefined method (e.g., postMigrate( )) for this purpose. The reply is intended to indicate to the client web component 201 that the shadow cache DOM 206 has been properly copied and that the server device 110 is ready to remotely execute the web component. The server device/server web component then transmits the reply to the client device/client web component (step 318).

The client device/client web component receives the reply via the relay 216. In response to the reply, the event queue is unfrozen (step 320) and inputs are again received at the web component 201. The web component 201 is now ready to use the server device 110 to remotely execute the component as appropriate. The details of that process will be described in FIG. 4.

It should be appreciated that the above communication between the client device 104 and the server device 110 may be performed using any suitable protocol or communications method. In some embodiments, for example, the relay between the client device and the server device allows for synchronous communication. In still other embodiments, it allows for asynchronous communication, in which the client web component 201 may register a callback, transmit a request to the server device 110 (e.g., step 314), receive a reply from the server web component (e.g., step 318), and then invoke the callback.

Figure 4:
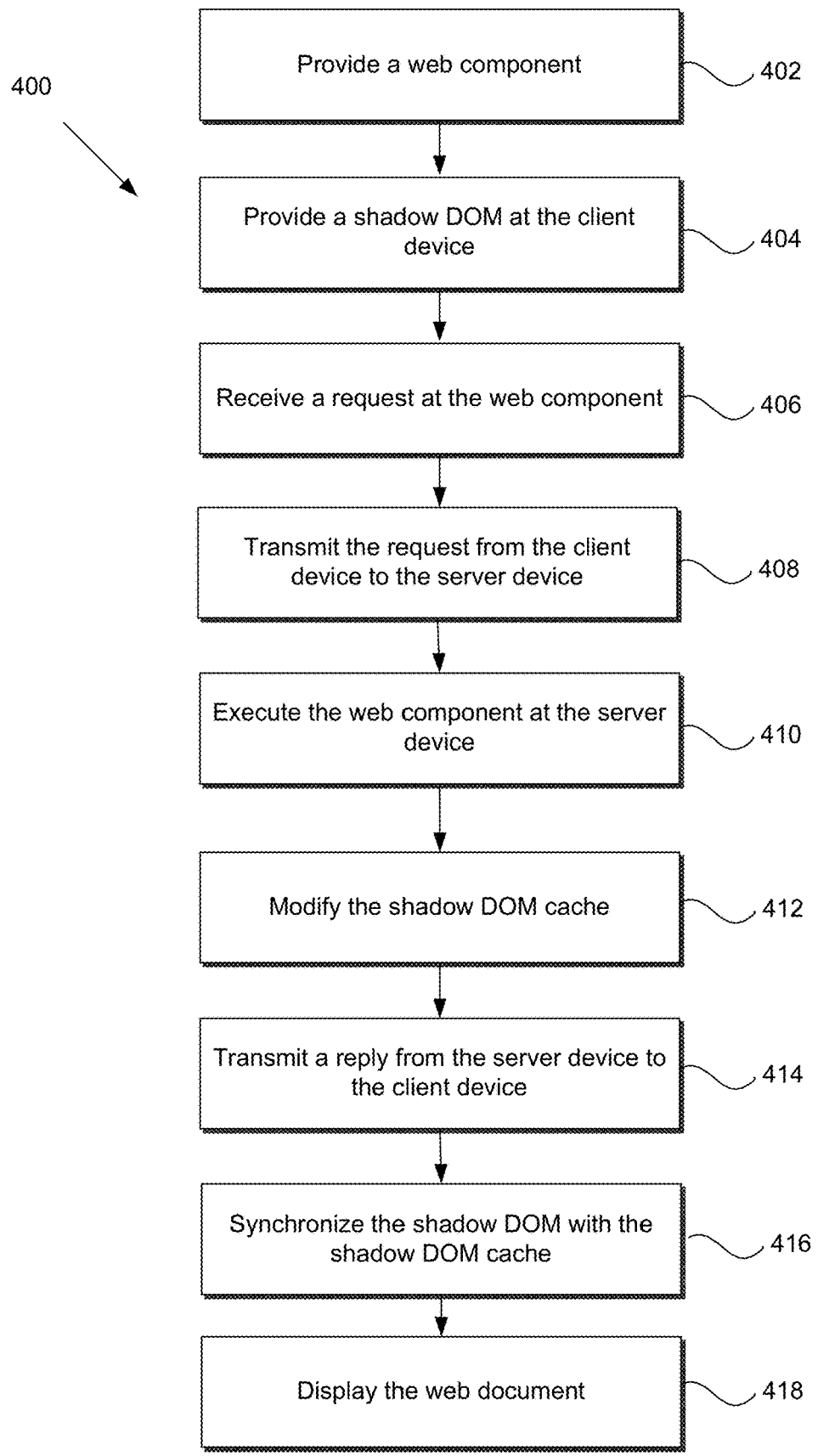
FIG. 4 is a flow diagram illustrating a method for synchronizing a shadow DOM at a client device and a shadow DOM cache at a server device according to a particular embodiment of the present invention.

Referring next to FIG. 4, a method for executing a web component at a remote server device 110 will be described according to a particular embodiment of the present invention. In various implementations, method 400 is performed after method 300 of FIG. That is, method 400 is performed after an initial copy of the shadow DOM 206 has been made at the server device 110 and the web component 201 has been successfully migrated to the server device 110.

At steps 402 and 404, a web component 201 and a shadow DOM 206 are provided at the client device 104 (e.g., as discussed in steps 302 and 308 of FIG. 3.) At step 406, a request is received at the web component 201. This request may be of any suitable type or format e.g., a command received at the API module 202a and/or a callback or event received at the callback/event module 204a. By way of example, a user who is using the client device 104 may view a web document and trigger an event (e.g., a mouseover or mouseclick over a button or other portion of the page) that the web component 201 is designed to react to.

At step 408, the client web component 201 then transmits the request to the server device 110 e.g., using relay 216. The server device 110 receives the request. The server device 110 then executes the server web component 203 (step 410). Based on the request, the server web component 203 modifies the shadow DOM cache 208 (step 412.) Such modifications may involve removing, adding and/or modifying one or more nodes or subtrees of the shadow DOM cache 208.

The server device/server web component then transmits a reply to the client device/client web component e.g., using the relay 216. The reply indicates changes that were made to the shadow DOM cache 208, so that such changes can be replicated at the shadow DOM 206. In some embodiments, the reply instead indicates changes that should be made to the shadow DOM 206, which are based on but not identical to the changes made to the shadow DOM cache 208. An example of one such implementation, which relates to the compaction of multiple nodes into fewer nodes, will be discussed later in the application. The reply may also include any other suitable data necessary to complete the client-server communication e.g., a confirmation indicating that the request that was sent by the client web component 201 (e.g., step 408) was properly received at the server web component 203, etc. As previously noted in connection with steps 314 and 318 of FIG. 3, the communication between the client device 104 and the server device 110 may be performed using any suitable protocol e.g., using asynchronous or synchronous communication techniques.

At step 416, the client web component 201 then synchronizes the shadow DOM 206 and the shadow DOM cache 208 based on the reply received from the server web component 203. In various embodiments, the client device 104 modifies the shadow DOM 206 in the same way that the shadow DOM cache 208 was modified in step 412. Alternatively, the modification may cause the shadow DOM 206 to be substantially similar to, but not identical to, the shadow DOM cache 208. That is, in some implementations, the shadow DOM 206, once modified, has multiple nodes that are in the same arrangement and have the same features as corresponding nodes in the shadow DOM cache 208, although a subset of those nodes/subtrees may differ in terms of their size.

At step 418, a web document, which includes code for the web component 201, is rendered and displayed at the client device 104. One or more features of the displayed document (e.g., its interface, organization, visual appearance, etc.) are based at least in part on the modifications made to the shadow DOM 206 in step 416.

The method 400 of FIG. 4 may be repeated multiple times. That is, over time, various requests may be received at the web component 201. The client device 104 transmits these requests to the server device, which each result in a change in the shadow DOM cache 203. The shadow DOM is then also adjusted based on each change at the shadow DOM cache, as discussed in method 400.

Figure 5:
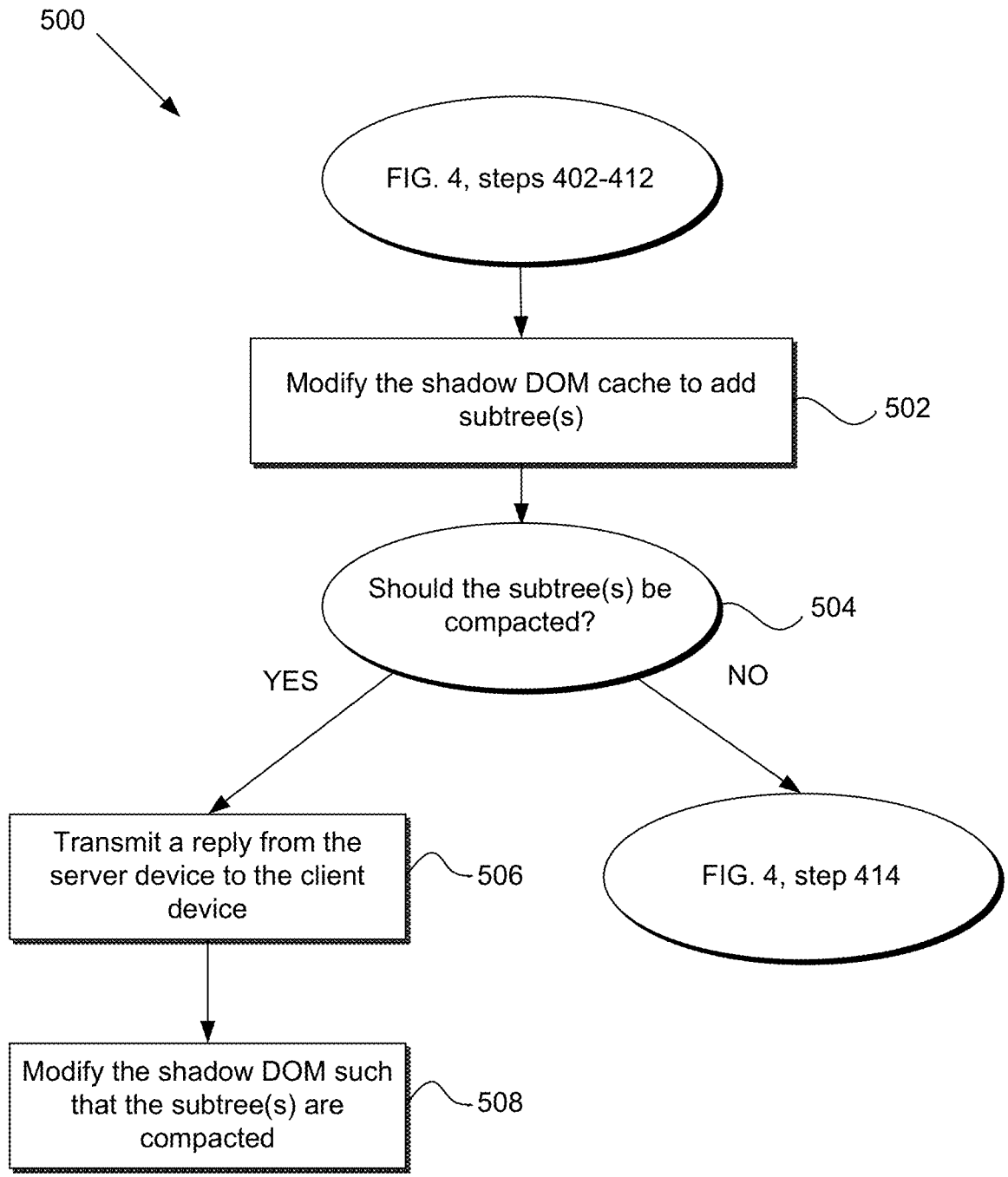
FIG. 5 is a flow diagram illustrating a method for compacting a subtree of a shadow DOM cache according to a particular embodiment of the present invention.

Referring next to FIG. 5, a method 500 for compacting a subtree of the shadow DOM cache 208 will be described according to a particular embodiment of the present invention. In various implementations, it can be desirable to modify the shadow DOM 206 in a different manner from that of the shadow DOM cache 208.

Consider the following simple example. The web component 201 receives an event or input that would cause a substantial change in the shadow DOM cache 208 (e.g., steps 406 and 412 in FIG. 4). By way of example, the change may involve the addition of multiple subtrees including many nodes, where each node involves drawing a portion of a complex image. In another example, the change may involve the addition of many subtrees and/or nodes that are arranged to process and render video.

Executing the code that corresponds to such nodes and subtrees would consume considerable overhead. If the shadow DOM cache 208 is copied in its entirety to the shadow DOM 206, the client device 104 would bear the burden of such overhead. As a result, in some cases, it is instead desirable to modify the shadow DOM 206 such that a subtree of multiple nodes at the shadow DOM cache 208 is compacted into a single node at the shadow DOM 206. The single node may involve displaying or generating content in a manner that requires lower overhead. An example of this process is described in further detail below.

The method begins with steps 402, 404, 406, 408 and 410 of FIG. 4. That is, the web component 201 at the client device 104 has received input (e.g., step 406), which has been transmitted to the server device 110 (e.g., step 408).

Afterward, at step 502, the server web component 203 modifies the shadow DOM cache 208 based on the web component code and the input. The modification causes the addition of at least one subtree, although any number of subtrees or nodes may be added, removed or modified as a result of the modification.

At step 504, the server device/server web component determines whether any subtree(s) should be compacted. This determination may be based on a variety of factors. In some embodiments, for example, the server device/server component makes the determination based on an analysis of the web component code. The web component code, for example, may contain a tag, a flag or other marker that indicates that compaction should and/or must take place. A developer may have inserted the marker into the code for that purpose.

Additionally or alternatively, the server device/server web component may make the determination dynamically. That is, the server device/server web component analyzes the extent and nature of the modifications to the shadow DOM cache 208, and makes the determination based on the analysis. This determination process may utilize any suitable heuristic technique. By way of example, the compaction determination may be based on a complexity of the subtree, an estimated overhead involved in executing code associated with the subtree, the type of media or effects associated with the subtree, etc.

If it is determined that the subtree(s) should not be compacted, then method 500 proceeds to step 414 of FIG. 4. That is, as previously discussed, the server web component 203 transmits a reply to the client device web component 201 and the shadow DOM 206 is modified to be identical to or substantially similar to the shadow DOM cache 208. In various implementations, the subtree(s) that is/are part of the modification of the shadow DOM cache 208 are retained in the modification of the shadow DOM 206, rather than being compacted.

Alternatively, if it is determined that the subtree(s) should be compacted (step 504), then at step 506 the server device/server web component transmits a reply to the web component 201 (e.g., as in step 414 of FIG. 4.) The reply includes data that causes the shadow DOM 206 to be modified in a manner that departs at least somewhat from the modification made to the shadow DOM cache 208. That is, the position, features and structure of the subtree(s) described in step 502 are not copied directly to the shadow DOM 206. Instead, the subtree(s) are (each) compacted into a single node.

Figure 9A:
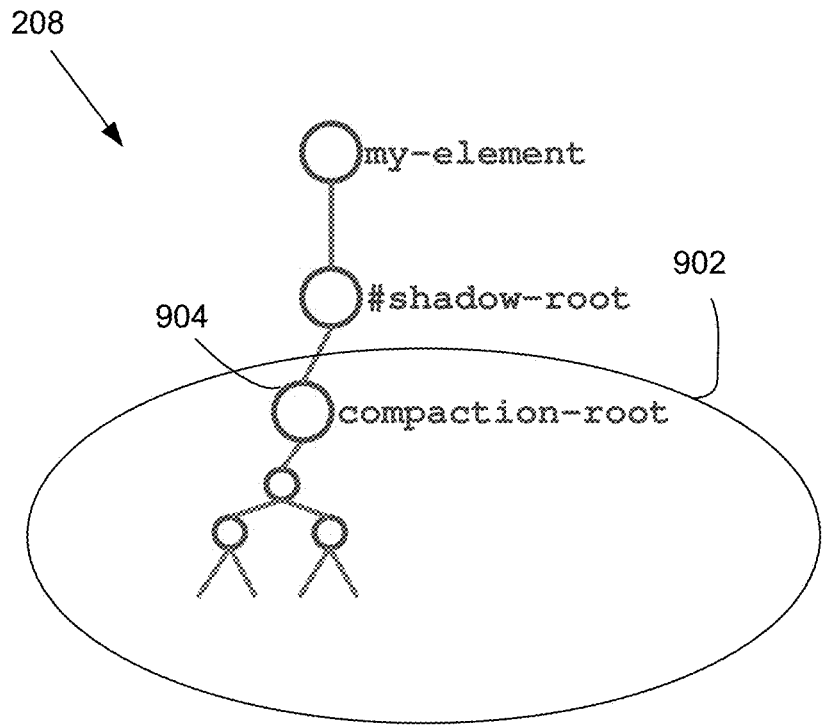
FIG. 9A is a simplified diagram of a shadow DOM cache after it has been modified to include a subtree according to a particular embodiment of the present invention.
Figure 9B:
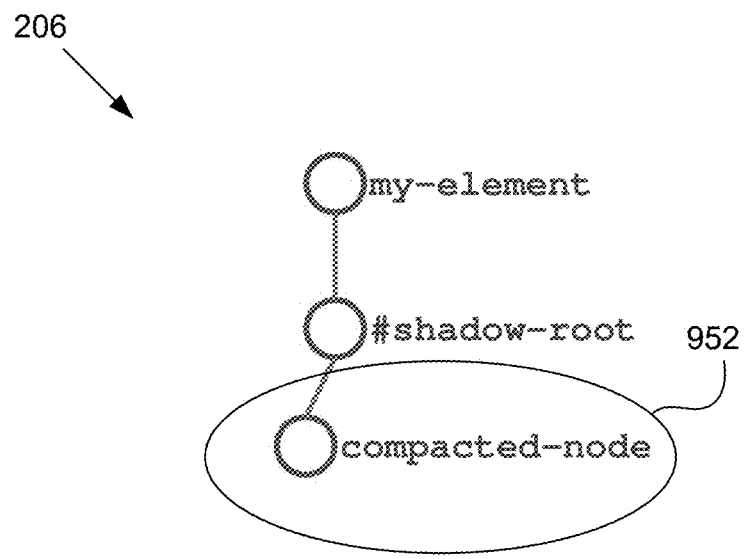
FIG. 9B is a simplified diagram of a shadow DOM in which the subtree of FIG. 9A has been compacted into a single node according to a particular embodiment of the present invention.

FIGS. 9A and 9B illustrate a simple example of this process. FIG. 9A illustrates a simplified shadow DOM cache 208 that has been modified (e.g., step 502) to include a subtree 1002. The subtree 902 begins at a compaction root node 904. In this example, the subtree 902 includes four nodes, although it may include any number of nodes. FIG. 9B represents a shadow DOM 206 after it has been modified based on the changes made to the shadow DOM cache 208 (e.g., step 508). The shadow DOM 206 is generally similar or the same as the shadow DOM cache 908, except that the subtree 902 has been compacted into a single compacted node 1052 from four nodes. That is, the position, arrangement and/or content of at least some or all of the other nodes outside the subtree 902 are the same in both the shadow DOM 206 and the shadow DOM cache 208. However, in place of the subtree 902 in the shadow DOM cache 208, the shadow DOM 206 has a single node 952.

This compaction method is useful in a variety of applications. For example, consider an example in which a subtree of a shadow DOM cache 208 includes multiple, even hundreds of nodes, each of which corresponds to code that draws a portion of a larger image. The server web component 203 is executed to help generate the image. At the shadow DOM 206, the subtree is compacted into a single or much fewer nodes. The compacted node(s) may relate to code that displays the image, which is transmitted from the server device 110 to the client web component 201 (e.g., step 414 of FIG. 4.) In another example, a subtree of a shadow DOM cache 208 may involve a subtree of many nodes that correspond to code that generates and renders a video. The server device 110 executes the web component code to generate frames of the video. At the shadow DOM 206, such a subtree may be compacted into a single or far fewer nodes, which simply display the frames, which are transmitted from the server device/server web component to the client web component 201. As a result, the overhead demands on the client device 104 are significantly reduced and much of the processing load is shifted to the server device 110.

Figure 6:
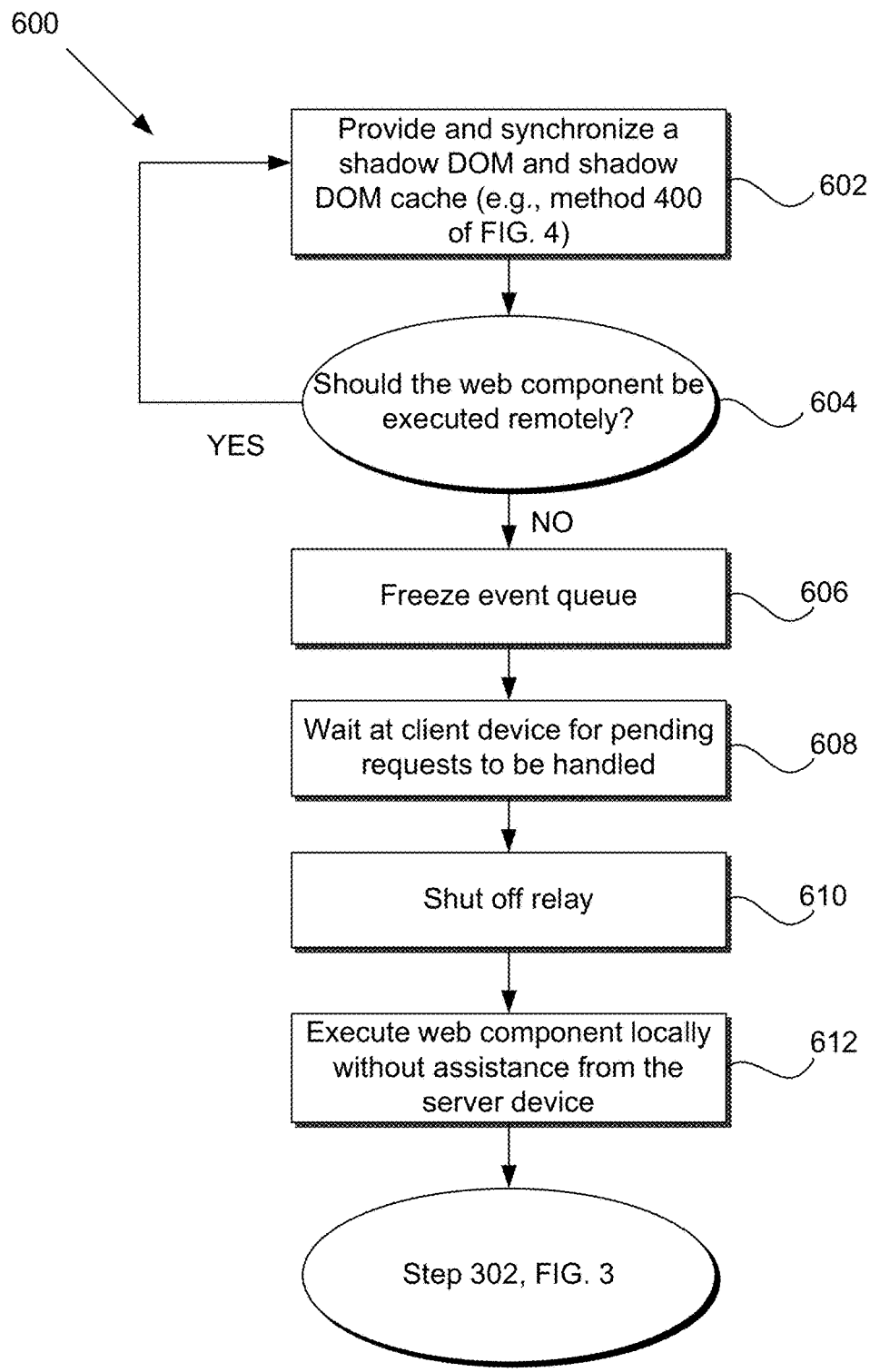
FIG. 6 is a flow diagram illustrating a method for ending a connection between the client device and the server device according to a particular embodiment of the present invention.

Referring next to FIG. 6, an example method 600 for discontinuing remote execution of a web component will be described. Method 600 may take place, for example, after the performance of methods 300 and 400 of FIGS. 3 and 4, respectively. That is, a client device 104 may be executing a web component at a remote server device 110 for a period of time. However, circumstances may arise that cause the client device 104 or the server device 110 to instead change course and only execute the web component at the client device 104.

At step 602, a shadow DOM 206 and a shadow cache 208 are provided at the client device 104 and the server device 110, respectively. The shadow DOM 206 and shadow cache 208 are synchronized. These steps may be performed as previously described in connection with method 400 of FIG. 4. That is, there is an ongoing synchronization between the shadow DOM 206 stored at the client device 104 and the shadow DOM cache 208 at the server device 110.

At step 604, a determination is made as to whether remote execution of the web component should be continued. This determination may involve a variety of different factors, including but not limited to network conditions, processing capacity at the client device and/or the server device, etc. In some embodiments, for example, the client device 104 and/or the server device 110 may determine that network conditions have deteriorated to the extent that the relay 216 between the client device 104 and server device can no longer be maintained. In still other embodiments, the client device 104 determines that its excess processing power and/or battery power is sufficient such that local execution of the web component is desirable.

If it is determined that the web component should still be executed at the server device, then the method proceeds back to step 602 and/or method 400 of FIG. 4. That is, the client device 104 and server device 110 maintain their relay and continue to synchronize the shadow DOM 206 and shadow DOM cache 208.

If it is determined that the web component should no longer be executed at the server device 110 and should instead be executed locally only at the client device 104, then the method 600 proceeds to step 606. At step 606, the event queue is frozen. That is, new inputs or events received by the client web component 201 are not forwarded to the server web component 203 for processing. This is done to prevent the state of the shadow DOM cache 208 from changing. Optionally, if the client web component 201 has recently transmitted requests to the server web component 203, then the web component 201 may wait for a predefined period of time to receive replies to those requests (step 608). Based on the replies, the web component then makes final modifications to the shadow DOM 206, as discussed in step 416 of FIG. 4.

At step 610, possibly after the aforementioned timer expires, the client device 104 and/or the server device 110 shut off the relay 216 (step 610). The client web component 201 then unfreezes the event queue and receives input via the API module 202a and the events/callback module 204b. At step 612, the web component 201 is executed locally and associated modifications are made to the shadow DOM 206 without the involvement of the shadow DOM cache 208 or the server device 110. In various implementations, the method 600 then proceeds to step 302 of FIG. 3. That is, at some future point in time, the web component may again be executed at the remote server device, based on a change in network, device or other parameters (e.g., step 304 of FIG. 3.)

Figure 10:
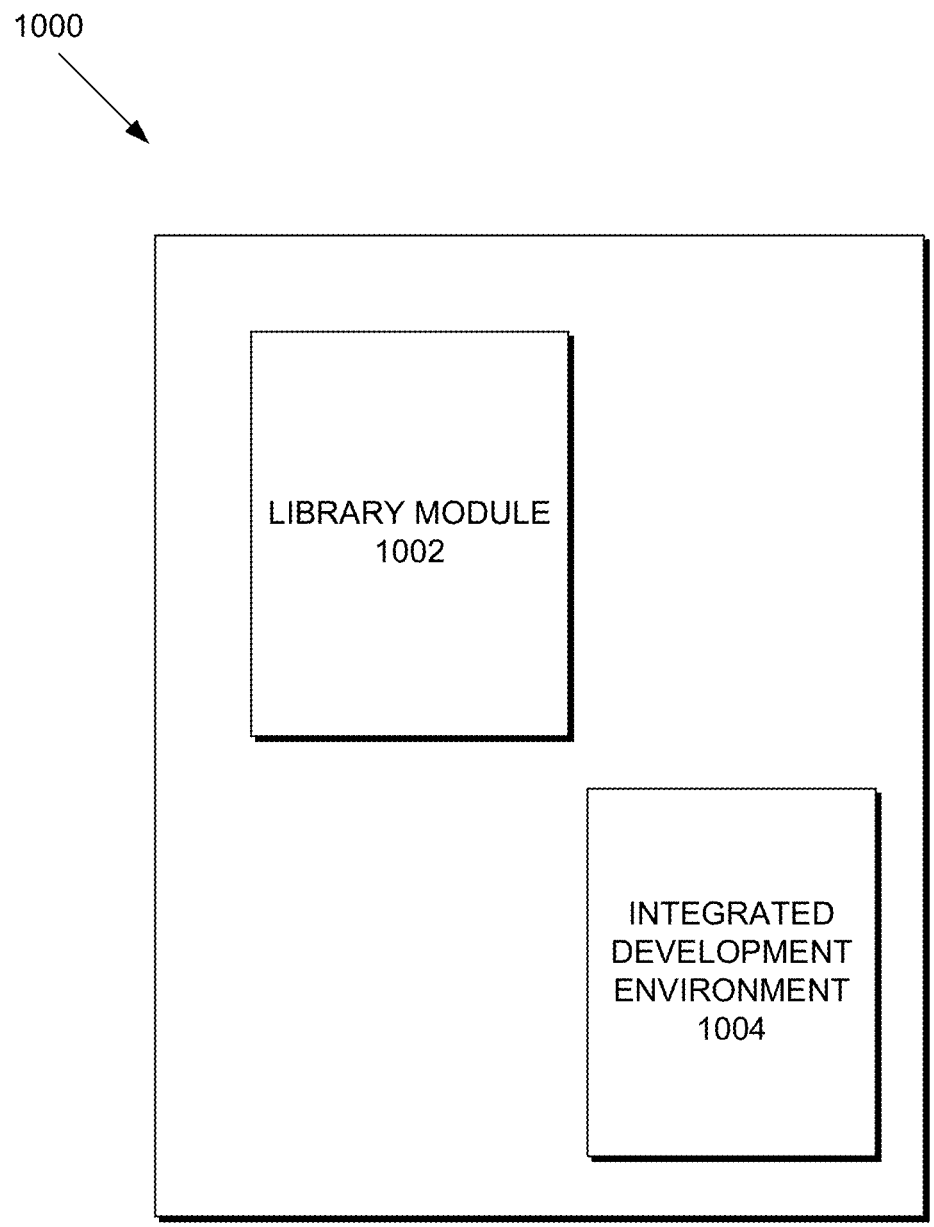
FIG. 10 is a diagram of a software development kit according to a particular embodiment of the present invention.

Referring next to FIG. 10, a software development kit (SDK) 1000 according to a particular embodiment of the present invention will be described. The SDK 1000 includes a library module 1002 and an integrated development environment (IDE) 1004. Generally, the SDK 1000 may contain any suitable tools for developing software that implements any of the methods, techniques and web components described in this application.

The library module 1002 includes one or more libraries that store methods, functions, modules and/or any software for implementing the methods described herein. In some embodiments, for example, the library module 1002 includes software for creating code (e.g., an HTML tag) that indicates that a web component can be implemented at a remote server device (e.g., as described in connection with step 304 of FIG. 3.) In various implementations, the library module 1002 includes software for creating a method that migrates a web component and/or a shadow DOM from a client device 104 to a server device 110 (e.g., as described in method 300 of FIG. 3). The library module 1002 may contain functions, methods and/or code for implementing any techniques or operations described in this application, including but not limited to the following:

function(s) for synchronizing a shadow DOM 206 stored at a client device 104 with a shadow DOM cache 208 stored at a server device 110 (e.g., as described in step 416 of FIG. 4)

function(s) for providing a customized tag (e.g., an HTML tag) that is arranged to instantiate a web component and/or that includes an indicator showing that the web component should be executed remotely at a server device 110 (e.g., as described in connection with step 304 of FIG. 3 and method 300);

function(s) for transmitting a web component 201 from the client device 104 to the server device 110 (e.g., as described in connection with step 314 of FIG. 3);

function(s) for compacting a subtree at the shadow DOM cache 208 into a single node at the shadow DOM 206 (e.g., as described in connection with method 500 of FIG. 5);

function(s) for ending an existing connection between a server device 110 and a client device 104 (e.g., as described in step 612 of FIG. 6);

function(s) for shifting web component execution back to the client device 104 from a server device 110 (e.g., as described in method 600 of FIG. 6);

function(s) for creating a web component whose execution can be performed either locally at a client device 104 or at a remote server device 110;

function(s) for transmitting an event or other input that is received at a web component 201 to a remote server device 110 (e.g., as described in step 408 of FIG. 4.)

Optionally, the software development kit may also include an integrated development environment (IDE) 1004. The IDE 1004 may be any suitable software that a developer can use to build web components and other software related to the methods described in this application. When executed on a computer, the IDE 1004 displays a user interface that assists in software development. In various embodiments, for example, a developer can use the IDE interface to obtain access to, display and program with any of the functions in the library module. It should be appreciated that the software development kit 1000 may present the above techniques and code in a wide variety of forms, including in the IDE, in software, on a display screen and/or in documentation. The above functions, libraries, IDE and other features of the software development kit 1000 may be stored in any suitable tangible computer readable storage medium. The computer readable storage medium includes executable computer code that, when executed by a processor of a device or computer that has access to the storage medium, can provide, display and/or execute any of the above features or functions of the software development kit 1000.

Figure 11:
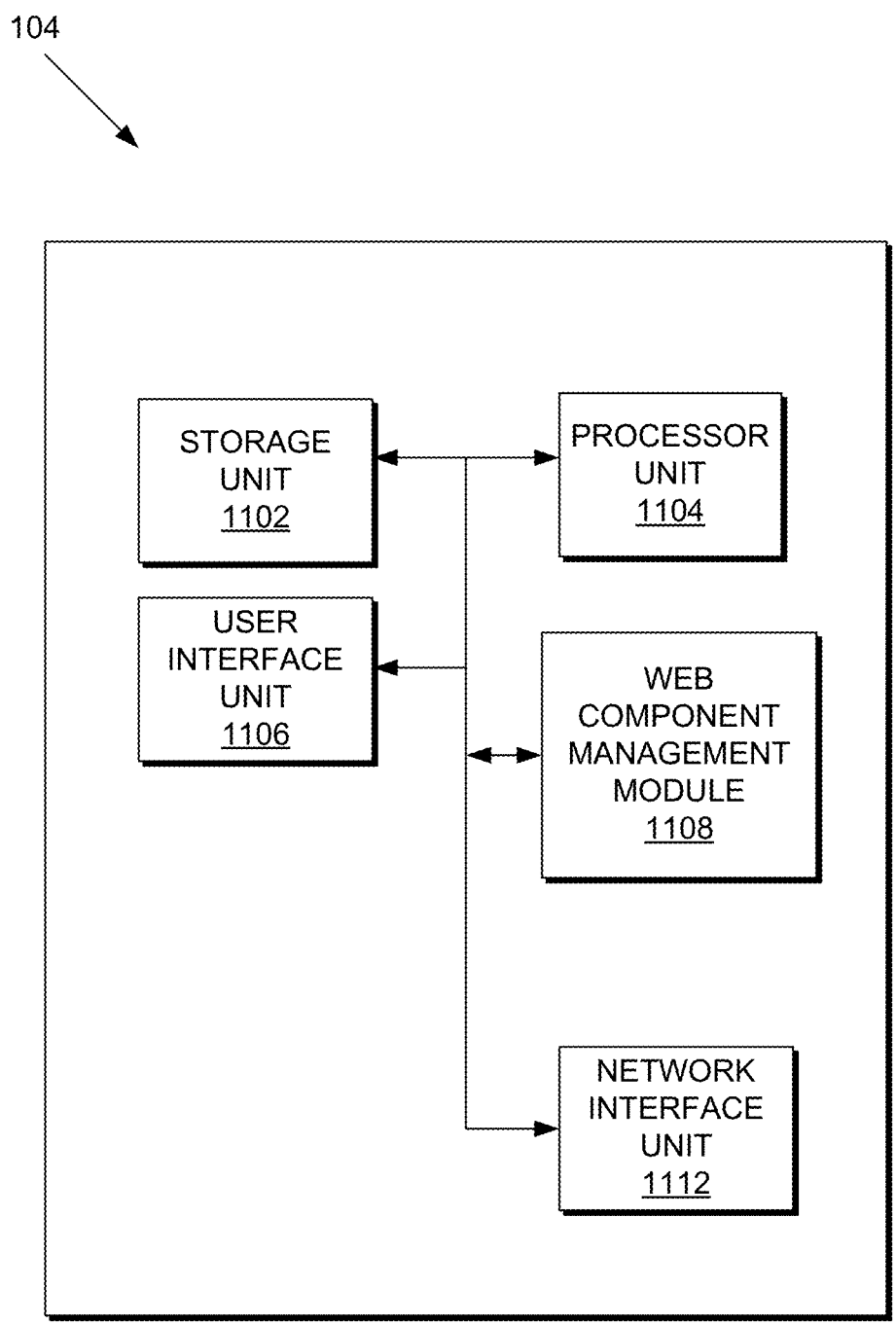
FIG. 11 is a block diagram of a client device according to a particular embodiment of the present invention.

Referring next to FIG. 11, a client device 104 according to a particular embodiment of the present invention will be described. By way of example, the client device 104 may be any of the client devices 104 of FIG. 1. The client device 104 includes a processor unit 1104 that includes one or more processors, a storage unit 1102, a web component management module 1108, a user interface unit 1106, and a network interface unit 1112. The client device 104 may be any suitable computing device, including but not limited to a desktop computer, a laptop, a smartphone, computer tablet, computer glasses, smartwatch and/or any other type of wearable or mobile technology.

The network interface unit 1112 includes any hardware or software suitable for enabling the device 104 to communicate with the server device 110 over the network 108. The network interface unit 1112 is arranged to transmit and receive data using any suitable network (e.g., LAN, Internet, etc.) or communications protocol (e.g., Bluetooth, WiFi, etc.)

The storage unit 1102 is any hardware or suitable for storing data or executable computer code. The storage unit 1102 can include but is not limited to a hard drive, flash drive, non-volatile memory, volatile memory or any other type of computer readable storage medium. Any operation or method for the client device 104 or the client web component 201 that is described in this application (e.g., methods 300, 400, 500 and 600 of FIGS. 3-6) may be stored in the form of executable computer code or instructions in the storage unit 1102. The execution of the computer code or instructions by the processor unit 1104 causes the device 104 to perform any of the aforementioned operations or methods.

The web component management module 1108 is any hardware or software arranged to perform any of the operations or methods (e.g., methods 300, 400, 50 and 600 of FIG. 3-6) described in this application that pertain to the client device 102 or the client web component 201. In various embodiments, the web component management module includes a browser that downloads a web application containing the web component 201. The browser is arranged to generate, modify and maintain the shadow DOM 206. In some implementations, the web component management module 1108 is stored in the storage unit 1102.

The user interface unit 1106 is any hardware or software for presenting a user interface to the user of the device 106a. In various embodiments, the user interface unit includes but is not limited to a mouse, a keyboard, a touch-sensitive (capacitive) screen, a video display, an e-ink display, an LCD screen, an OLED screen and a heads up display. The user interface 1106 may also be capable of receiving audio commands and making audio statements. In various implementations, the user interface unit 1106 display a web page or web application that reflects changes made to the shadow DOM (e.g., as discussed in connection with step 416 of FIG. 4.)

Figure 12:
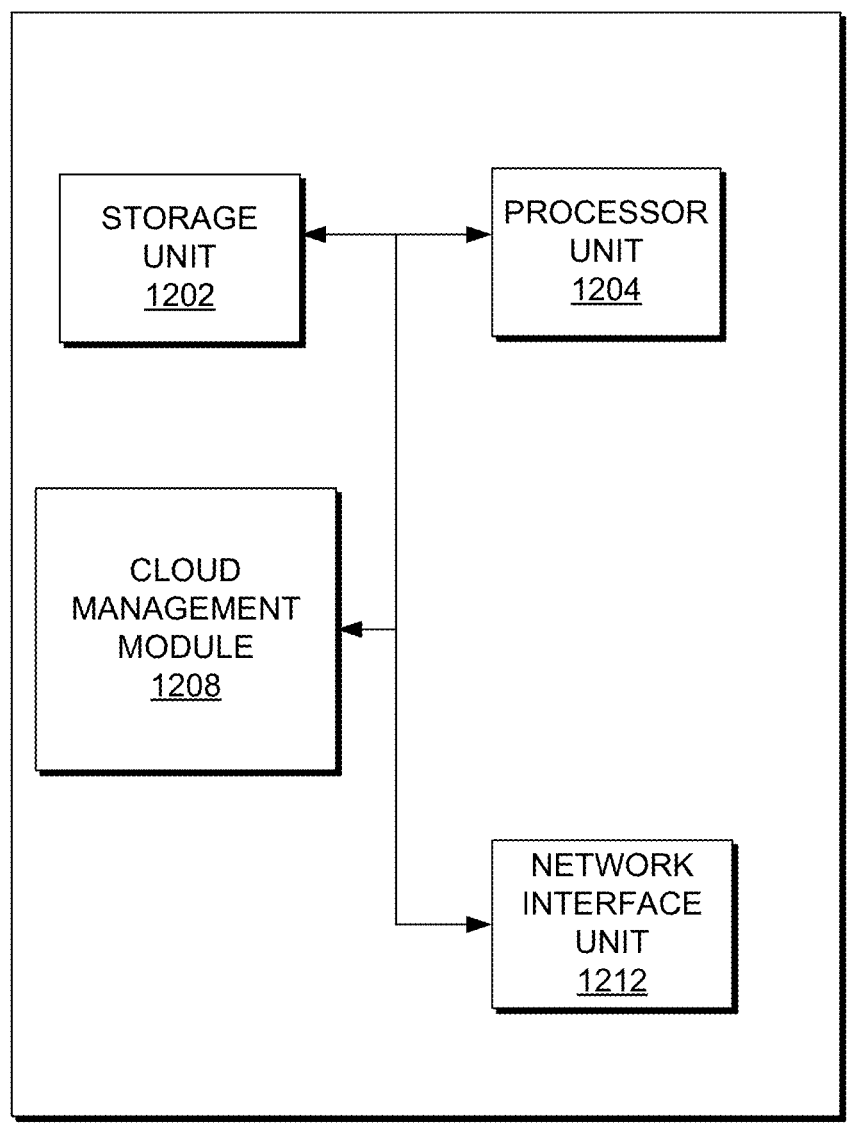
FIG. 12 is a block diagram of a server device according to a particular embodiment of the present invention.

Referring next to FIG. 12, a server device 1200 according to a particular embodiment of the present invention will be described. The server 1200 includes a processor unit 1204 that includes one or more processors, a storage unit 1202, a cloud management module 1208, and a network interface unit 1212. The server 1200 may be, for example, the server 110 illustrated in FIG. 1.

The network interface unit 1212 includes any hardware or software suitable for enabling the server 110 to communicate with the client devices 104 of FIG. 1. The network interface unit is arranged to transmit and receive data using any suitable network (e.g., LAN, Internet, etc.) or communications protocol (e.g., Bluetooth, WiFi, etc.)

The storage unit 1202 is any hardware or suitable for storing data or executable computer code. The storage unit 1202 can include but is not limited to a hard drive, flash drive, non-volatile memory, volatile memory or any other type of computer readable storage medium. Any operation or method for the server 110 or the server web component 203 that is described in this application (e.g., methods 300, 400, 500 and 600 of FIGS. 3-6) may be stored in the form of executable computer code or instructions in the storage unit 1202. The execution of the computer code or instructions by the processor unit 1204 (which includes one or more processors) causes the server 110 to perform any of the aforementioned operations or methods.

The cloud management module 1208 is any hardware or software arranged to perform any of the operations or methods (e.g., methods 300, 400, 50 and 600 of FIG. 3-6) described in this application that pertain to the server device 110 or the server web component 203. In various embodiments, for example, the cloud management module 1208 is arranged to handle the migration of the web component to the server device (e.g., as described in method 300 of FIG. 3). The cloud management module 1208 is further arranged to receive inputs from the client web component 201, make modifications to the shadow DOM cache 208 and/or synchronize those changes with the shadow DOM 208 (e.g., as described in method 400 of FIG. 4.) The module 1208 is also arranged to make and execute compaction determinations (e.g., as described in connection with method 500 of FIG. 5). In various approaches, the module also is arranged to make determinations related to the continued execution of the web component at the remote server device 110 (e.g., as described in connection with method 600 of FIG. 6.) The module 1208 may include the server web component 1203 illustrated in FIG. 2. The module 1208 may also be stored in the storage unit 1202.

Any of the methods or operations described herein can be stored in a tangible computer readable medium in the form of executable software code. The code can then be executed by one or more processors. The execution of the code causes a corresponding device (e.g., client device 104 or server device 110) to perform the described operations.

The above methods sometimes specify that a particular module (e.g., a client device, a server device, a client web component, a server web component, etc.) performs a particular action. However, it should be appreciated that other components and modules may also perform the same action instead. For example, an action performed by a client web component 201 may instead be performed by another component or module in the client device 201. The same is true for the server device 110 and the server web component 203.

Although only a few embodiments of the invention have been described in detail, it should be appreciated that the invention may be implemented in many other forms without departing from the spirit or scope of the invention. For example, the present application and figures describe various methods (e.g., methods 300, 400, 500 and 600 of FIGS. 3-6) having particular operations. It should be appreciated that in some embodiments, one or more of these operations/steps may be modified, reordered and/or deleted. Additionally, some figures, such as FIGS. 2, 10, 11 and 12, describe devices that contain various components. It should be noted that in some embodiments, one or more of these components may be merged together. In still other embodiments, one or more components may be separated into a greater number of components. The features of one component may be transferred to another and/or modified as appropriate. Each device may have additional components beyond what is shown in the corresponding figure. For example, the device 104 of FIG. 11 may also include any component, technology, sensor, user interface or feature that is included in any known smartphone or mobile device. Additionally, the aforementioned methods also be modified as appropriate for different applications and need not performed exactly as described above. By way of example, some embodiments (e.g., method 300 of FIG. 3) indicate that the client web component 201 may be transmitted to the server device 110. However, this may mean that only particular elements, parts or modules in the web component are transmitted, rather than the web component in its entirety. In some approaches, the client web component need not be transmitted, since the web component is already stored at the server device or can be obtained through some other means. Therefore, the present embodiments should be considered illustrative and not restrictive and the invention is not to be limited to the details given herein.

What is claimed is:

1. A computer implemented method for implementing one or more functions, the one or more functions comprising:
   causing an execution, in response to a request, of a web component at a server device based on a customized tag, and at least one of (i) network traffic conditions, (ii) processing capacity at a client device, (iii) processing capacity at the server device, or a combination thereof, wherein a shadow DOM is created in association with the web component;
   receiving information based on a modification of a shadow DOM cache stored at a server device, wherein the information includes a determination to modify the shadow DOM stored at the client device to include a compacted subtree corresponding to a subtree of the shadow DOM cache; and
   synchronizing the shadow DOM stored at the client device with the shadow DOM cache stored at the server device based on the received information, wherein after synchronization the shadow DOM comprises a partial copy of the shadow DOM cache and wherein the shadow DOM contains a subtree that differs in size from a corresponding subtree of the shadow DOM cache;
   determining, after synchronizing, that the web component should no longer be executed at the server device;
   stopping forward inputs or requests to the server device from the client device for a period of time;
   terminating a connection between the client device and the server device;
   executing the web component at the client device without involvement of the server device; and
   causing the execution of the web component to be terminated at the server device.

2. The method as recited in claim 1, wherein:
   the customized tag is an HTML tag; and
   the web component is written at least partly in Javascript.

3. The method as recited in claim 1, wherein the one or more functions further comprise:
   transmitting the web component from the client device to the server device so that the web component can be executed at the server device, wherein the shadow DOM and the shadow DOM cache represent a structure of a document generated at least in part by the web component.

4. The method as recited in claim 1, wherein after synchronization, the shadow DOM contains a single node that represents a corresponding subtree in the shadow DOM cache in a compacted form.

5. A non-transitory computer readable medium including a plurality of instructions that, when executed by a processor, causes the processor to:
   execute, in response to a request, a web component at a server device based on a customized tag, and at least one of (i) network traffic conditions, (ii) processing capacity at a client device, (iii) processing capacity at the server device, or a combination thereof, wherein a shadow DOM is created in association with the web component;
   receive information based on a modification of a shadow DOM cache stored at a server device, wherein the information includes a determination to modify the shadow DOM stored at the client device to include a compacted subtree corresponding to a subtree of the shadow DOM cache,
   synchronize a shadow DOM stored at a client device with the shadow DOM cache stored at the server device based on the received information, wherein, after synchronization, the shadow DOM comprises a partial copy of the shadow DOM cache wherein the shadow DOM contains a subtree that differs in size from a corresponding subtree of the shadow DOM cache;
   determine, after synchronizing, that the web component should no longer be executed at the server device;
   stop forward inputs or requests to the server device from the client device for a period of time;
   terminate a connection between the client device and the server device;
   execute the web component at the client device without involvement of the server device; and
   cause the execution of the web component to be terminated at the server device.

6. The non-transitory computer readable medium of claim 5, wherein:
the customized tag is an HTML tag; and
the web component is written at least partly in Javascript.

7. The non-transitory computer readable medium of claim 5, wherein the request received at the web component involves an event triggered by a user of the client device.

8. The non-transitory computer readable medium of claim 5, wherein the plurality of instructions further cause the processor to:
instantiate the web component at the client device;
execute the web component at the client device;
create the shadow DOM on the client device based on the web component;
transmit the shadow DOM to the server device so that a copy can be made of the shadow DOM to generate the shadow DOM cache at the server device, wherein synchronization occurs after the instantiation of the web component, the creation of the shadow DOM at the client device and the transmission of the shadow DOM to the server device.

9. The non-transitory computer readable medium of claim 5, wherein the plurality of instructions further cause the processor to:
receive a request from the server device indicating that the shadow DOM cache has been modified and that the shadow DOM should be synchronized with the shadow DOM cache wherein the modification of the shadow DOM cache creates a subtree, the subtree including one or more nodes; and
cause the shadow DOM of the client device to be modified in response to the request from the server device such that after synchronization the shadow DOM resembles the shadow DOM cache except that the shadow DOM contains a single node that represents a corresponding subtree of the shadow DOM cache in a compacted form.

10. The non-transitory computer readable medium of claim 9, wherein:
each node of the subtree involves code for drawing a different portion of an image; and the single node involves code for displaying the image.

11. The non-transitory computer readable medium of claim 5 wherein the plurality of instructions further causes the processor to:
display a web document at the client device based on the synchronized shadow DOM.

12. A server device comprising:
network interface; and
at least one processor configured to:
generate a shadow DOM cache,
execute, in response to a request, a web component at the server device based on a customized tag, and at least one of (i) network traffic conditions, (ii) processing capacity at a client device, (iii) processing capacity at the server device, or a combination thereof, wherein a shadow DOM is created in association with the web component;
modify the shadow DOM cache based on execution of a web component,
determine a modification to the shadow DOM stored at the client device to include a compacted subtree corresponding to a subtree of the shadow DOM cache;
transmitting information, including information on the modification of the shadow DOM cache and determination to compact the subtree of the shadow DOM, to cause the shadow DOM stored at the client device to synchronize with the shadow DOM, wherein:
after synchronization, the shadow DOM comprises a partial copy of the shadow DOM cache,
the shadow DOM contains a subtree that differs in size from a corresponding subtree of the shadow DOM cache;
terminating the execution of the web component at the server device in response to the client device:
determining, after synchronizing, that that web component should no longer be executed at the server device,
stopping, forward inputs or requests to the server device from the client device for a period of time;
terminating, a connection between the client device and the server device; and
executing, without involvement of the server device, the web component at the client device.

13. The server device of claim 12, wherein:
the customized tag is an HTML tag; and
the web component is written at least partly in Javascript.

14. The server device of claim 12, wherein the determination is based on at least one of 1) an analysis of the subtree; and 2) an indicator in software code for the web component, indicating that the compaction should take place.

15. The server device of claim 12, wherein the at least one processor is further configured to:
determine that the synchronization between the shadow DOM and the shadow DOM cache should not continue; and
closing a network connection between the client device and the server device.

* * * * *